US010326538B2

(12) United States Patent
Dogan et al.

(10) Patent No.: US 10,326,538 B2
(45) Date of Patent: Jun. 18, 2019

(54) REMOTE RADIO HEAD RECIPROCITY CALIBRATION

(71) Applicant: Cisco Technology, Inc., San Jose, CA (US)

(72) Inventors: Mithat C. Dogan, San Jose, CA (US); Jiunming Huang, San Jose, CA (US); Brian D. Hart, Sunnyvale, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/480,197

(22) Filed: Apr. 5, 2017

(65) Prior Publication Data

US 2018/0294898 A1 Oct. 11, 2018

(51) Int. Cl.
| | |
|---|---|
| *H04B 7/06* | (2006.01) |
| *H04B 17/12* | (2015.01) |
| *H04B 17/14* | (2015.01) |
| *H04B 17/21* | (2015.01) |
| *H01Q 3/26* | (2006.01) |
| *H04B 7/024* | (2017.01) |
| *H04B 7/0417* | (2017.01) |

(Continued)

(52) U.S. Cl.
CPC ............... *H04B 17/12* (2015.01); *H01Q 3/26* (2013.01); *H04B 7/024* (2013.01); *H04B 7/0417* (2013.01); *H04B 7/0626* (2013.01); *H04B 17/14* (2015.01); *H04B 17/21* (2015.01); *H04L 25/0248* (2013.01); *H04L 5/14* (2013.01)

(58) Field of Classification Search
CPC ...... H04B 17/12; H04B 7/024; H04B 7/0626; H04B 7/0417; H01Q 3/26; H04L 25/0248; H04L 5/14
USPC ................ 375/259, 260, 267, 295, 299, 316
See application file for complete search history.

(56) References Cited

U.S. PATENT DOCUMENTS

| | | |
|---|---|---|
| 6,615,024 B1 | 9/2003 | Boros et al. |
| 6,668,161 B2 | 12/2003 | Boros et al. |

(Continued)

FOREIGN PATENT DOCUMENTS

WO    2016176626 A1    11/2016

OTHER PUBLICATIONS

W.E. Roth, "The Equations AX−YB=C and AX−XB=C in Matrices", Proceedings of the American Mathematical Society, vol. 3, No. 3 (Jun. 1952), pp. 392-396. http://www.jstor.org/stable/2031890?seq=1#page_scan_tab_contents <http://www.jstor.org/stable/2031890?seq=1>.

(Continued)

*Primary Examiner* — Siu M Lee
(74) *Attorney, Agent, or Firm* — Patterson + Sheridan, LLP

(57) ABSTRACT

Embodiments herein describe calibrating a plurality of radio heads having a plurality of wireless antennas. In one embodiment, the plurality of radio heads communicate a calibration signal in a round robin fashion such that each of the radio heads communicates a respective calibration signal to the remaining radio heads. The received calibration signals are then used to calibrate the radio heads. In one embodiment, a controller coupled with the plurality of radio heads calibrates the radio heads. The calibrated radio heads then communicate to one or more client devices.

14 Claims, 3 Drawing Sheets

(51) Int. Cl.
*H04L 25/02* (2006.01)
*H04L 5/14* (2006.01)

(56) References Cited

U.S. PATENT DOCUMENTS

| | | | | |
|---|---|---|---|---|
| 6,870,878 | B1* | 3/2005 | Doi | H01Q 3/2605 375/226 |
| 6,963,742 | B2 | 11/2005 | Boros et al. | |
| 8,416,126 | B2* | 4/2013 | Malmqvist | H01Q 3/267 342/174 |
| 2006/0135211 | A1* | 6/2006 | Chae | H01Q 3/26 455/562.1 |
| 2010/0321233 | A1* | 12/2010 | Ben-Zur | H01Q 3/267 342/174 |
| 2012/0028587 | A1* | 2/2012 | Ferguson | H01Q 3/267 455/67.14 |
| 2015/0222336 | A1* | 8/2015 | Yilmaz | H04B 7/024 370/252 |
| 2016/0013849 | A1* | 1/2016 | Kakishinna | H04B 7/0413 375/267 |
| 2016/0142094 | A1* | 5/2016 | Papadopoulos | H04B 17/14 375/219 |
| 2016/0308624 | A1* | 10/2016 | Rong | H04B 7/024 |
| 2017/0272180 | A1* | 9/2017 | Jitsukawa | H04B 17/21 |

OTHER PUBLICATIONS

Ilse C. F. Ipsen, "Computing an Eigenvector With Inverse Iteration" SIAM REV. c 1997, Society for Industrial and Applied Mathematics, vol. 39, No. 2, pp. 254-291, Jun. 1997: <http://www4.ncsu.edu/~ipsen/ps/sirev_invit.pdf>.

Caramanis et al. EE 381V: Large Scale Learning Spring 2013, Lecture 12, Feb. 26 and 28: <http://users.ece.utexas.edu/~sanghavi/courses/scribed_notes/Lecture_13_and_14_Scribe_Notes_pdf>.

Sabine Van Huffel, Total Least Squares and Errors-in-Variables Modeling: Bridging the Gap between Statistics, Computational Mathematics and Engineering, Feb. 18, 2004. <http://citeseerx.ist.psu.edu/viewdoc/download?doi=10.1.1.4.2592&rep=rep1&type=pdf>.

William H. Press, Saul A. Teukolsky, William T. Vetterling, Brian P. Flannery, "Numerical Recipes in C The Art of Scientific Computing," Second Edition, 1992; pp. 915-925. http://apps.nrbook.com/c/index.html.

C. Shepard, H. Yu, N. Anand, E.L. Li, T.L. Marzetta, Y.R. Yang, L. Zhong, "Argos: practical many-antenna base stations", MOBICOM'12, pp. 53-64. http://dl.acm.org/citation.cfm?id=2348553.

R. Rogalin, O. Y. Bursalioglu, H. Papadopoulos, G. Caire, A. Molisch, A. Michaloliakos, V. Balan, and K. Psounis, "Scalable Synchronization and Reciprocity Calibration for Distributed Multiuser MIMO", IEEE Transactions on Wireless communications, vol. 13, Issue 4, pp. 1815-1831, 2014. <http://www-bcf.usc.edu/~kpsounis/Papers/scalable_dist_mimo.pdf>.

Extended European Search Report for Application No. 18164829.6-1219 dated Aug. 23, 2018.

* cited by examiner

REMOTE RADIO HEAD RECIPROCITY CALIBRATION

TECHNICAL FIELD

Embodiments presented in this disclosure generally relate to calibrating wireless devices, and more specifically, to calibrating a plurality of radio heads.

BACKGROUND

In wireless communication systems, a client device communicates with an access point (AP) to utilize the wireless network associated with the AP. An AP may have multiple radio heads for communicating with a client device. Modern wireless communication networks may have multiple APs having multiple radio heads in order to provide multiple client devices simultaneous access to the wireless network. However, as the number of radio heads increases, so does the amount of interference caused by the radio heads. Thus, radio heads may need to be calibrated to improve communication with clients of the wireless network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
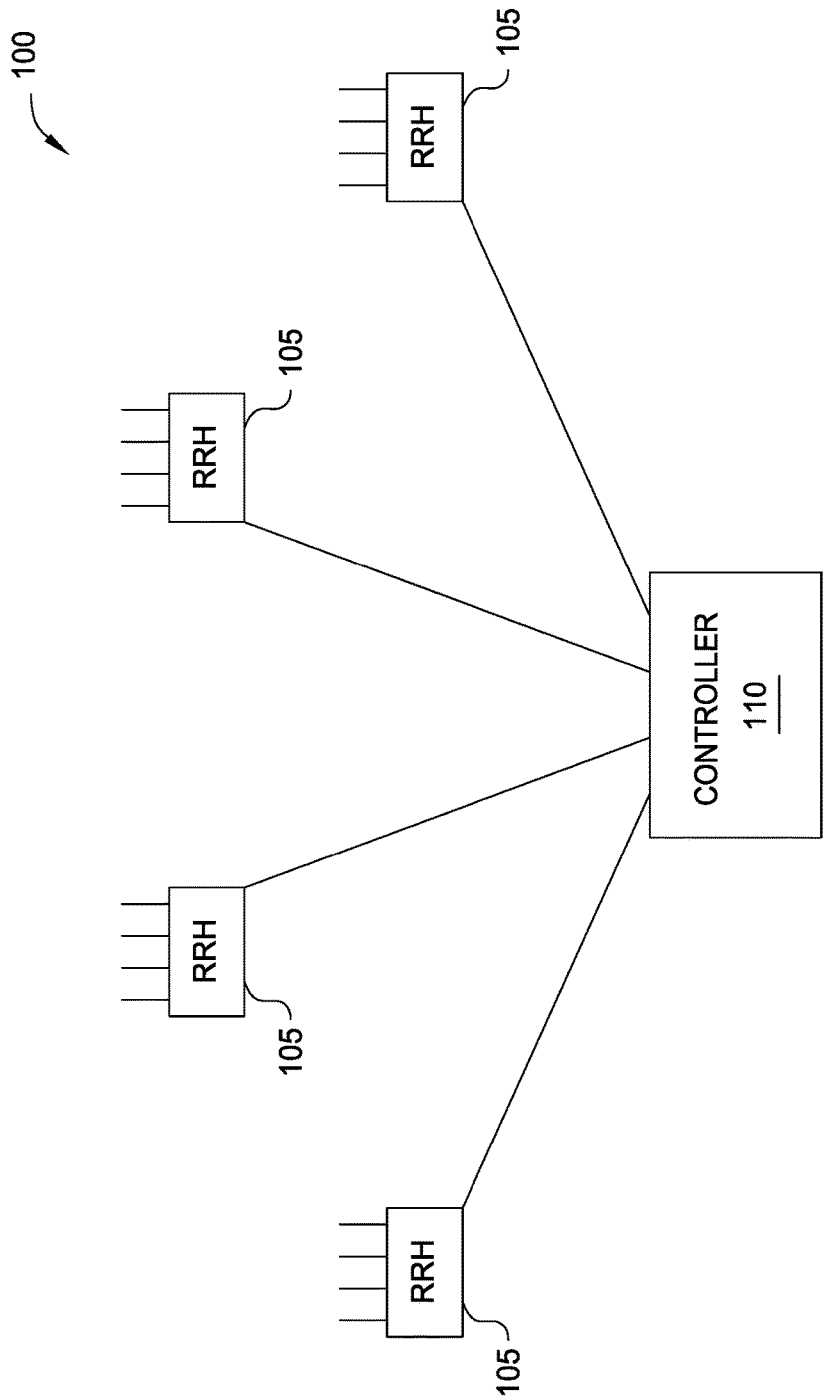
FIG. 1 illustrates a wireless system, according to one embodiment disclosed herein.

One embodiment presented in this disclosure is a method for calibrating a first radio head and a second radio head, wherein the first radio head and the second radio head comprise a respective plurality of antennas. The method comprises transmitting, via the plurality of antennas of the first radio head, a first calibration signal to the second radio head, wherein the plurality of antennas of the second radio head receives the first calibration signal. The method also comprises transmitting, via the plurality of antennas of the second radio head, a second calibration signal to the first radio head, wherein the plurality of antennas of the first radio head receives the second calibration signal. The method further comprises calibrating the first radio head and the second radio head based on a calibration vector determined from the calibration signals received at the respective plurality of antennas of the first radio head and the second radio head.

One embodiment presented in this disclosure is a system, comprising a processor; and a memory comprising instructions which, when executed on the processor, performs an operation for calibrating a first radio head and a second radio head, wherein the first radio head and the second radio head comprise a respective plurality of antennas. The operation comprises transmitting, via the plurality of antennas of the first radio head, a first calibration signal to the second radio head, wherein the plurality of antennas of the second radio head receives the first calibration signal. The operation also comprises transmitting, via the plurality of antennas of the second radio head, a second calibration signal to the first radio head, wherein the plurality of antennas of the first radio head receives the second calibration signal. The operation further comprises calibrating the first radio head and the second radio head based on a calibration vector determined from the calibration signals received at the respective plurality of antennas of the first radio head and the second radio head.

One embodiment presented in this disclosure is a computer program product for calibrating a first radio head and a second radio head, wherein the first radio head and the second radio head comprise a respective plurality of antennas. The computer program product comprises a non-transitory computer-readable medium having program instructions embodied therewith, the program instructions executable by a processor to perform an operation that comprises transmitting, via the plurality of antennas of the first radio head, a first calibration signal to the second radio head, wherein the plurality of antennas of the second radio head receives the first calibration signal. The computer program product also comprises transmitting, via the plurality of antennas of the second radio head, a second calibration signal to the first radio head, wherein the plurality of antennas of the first radio head receives the second calibration signal. The computer program product further comprises calibrating the first radio head and the second radio head based on a calibration vector determined from the calibration signals received at the respective plurality of antennas of the first radio head and the second radio head.

Example Embodiments

In wireless communications, Multiple-Input and Multiple-Output (MIMO) is a method of communicating between multiple transmit and receive antennas to take advantage of spatial diversity and spatial multiplexing. A common wireless system used today is Wi-Fi, which is a Time Division Duplex (TDD) wireless system that uses the same frequency band to transmit and receive data by using the band over disjoint intervals. MIMO systems that utilize TDD either need explicit channel characteristics to determine spatial processing parameters or attempt to determine the channel characteristics implicitly by using multi-antenna samples to determine the transmit strategy per client. The channel characteristics define the amplitude and phase changes caused when wireless signals are transmitted in a communication channel between two network devices.

In wireless networks, radio heads may utilize beamforming to improve communication among radio heads and/or client devices. Beamforming is a method that takes advantage of the channel characteristics of wireless networks. With beamforming, the phase and gain of a plurality of signals are altered in such a way to create constructive interference to improve the combined signals at specific location. Thus, a MIMO system may use beamforming to provide improved signal strength at the location of a user.

The explicit approach to determining the channel characteristics requires regular communication between the client and the multiple APs, which is expensive in terms of signaling cost. The APs comprise one or more radio heads (RH), which is a distributed transceiver that mixes down to baseband I/Q and feeds those samples back to the centralized processing system of the AP. The implicit approach relies on channel reciprocity between the communicating RHs. That is, the channel characteristics determined by the transmitter can be used to determine the channel characteristics for the receiver without communication among the radio heads. For example, the effective channel (observed at baseband) from a first RH A to a second RH B is the product of transmitter gain of RH A multiplied by the propagation channel which is multiplied by the receiver gain of RH B. In contrast, the effective channel from RH B to RH A is the product of transmitter gain of RH B multiplied by the propagation channel which is multiplied by the receiver gain of RH A.

Although the selected receiver and transmitter gains of RH A and RH B may be known, these are analog quantities that drift from the original specification of the RHs due to external factors such as manufacturing tolerances; aging; infeasibility of measuring due to large number of automatic gain control (AGC) states, power transmit states, bands and/or channels; etc. Thus, the implicit approach discussed above becomes less accurate because the implicit approach relies on the original specification of the RHs and does not take into account interference that is present in real world situations. Therefore, a wireless network can be improved by calibrating the physical characteristics of the RHs.

For example, when the RHs are distributed to cover a larger area and are coordinated to form a coordinated remote radio head cluster implementing MIMO technology, all transmit and receive chains of a remote radio head cluster can be jointly calibrated for reciprocity. However, because remote radio head are separated from each other to cover a large area, channel estimates for calibrating tend to be noisy compared to calibrating the antennas of a single AP with a small distance between antennas.

FIG. 1 illustrates a wireless network having multiple remote radio heads (RRHs) and a controller, according to one embodiment herein. As shown in FIG. 1, the wireless network 100 includes four RRHs 105. Further, the RRHs 105 are connected with a controller 110. In one embodiment, the controller 110 is implemented as a single computing device having any suitable form. In other embodiments, the controller 110 is a distributed computing device and includes a plurality of discrete computing devices that are connected through wired or wireless networking. While four RRHs 105 have been illustrated for simplicity, the system may contain any number of RRHs and should not be limited to four.

As shown in FIG. 1, each of the RRHs 105 has four wireless antennas for communicating with client devices (not shown). In one exemplary embodiment, the RRHs communicate using the 802.11 protocol, and the RRHs 105 form a single network for communicating with client devices, such as a MIMO network. Further, the RRHs 105 may communicate with a client device using beamforming, as is known in the art. While the RRHs 105 have been illustrated with four wireless antennas, it is to be understood that the RRHs may have any number of antennas and should not be limited only to four.

In one exemplary embodiment, the four RRHs 105 and the wireless antennas of the RRHs 105 are synchronized via the controller 110. That is, each of the RRHs 105 operates in unison with one another based upon commands from the controller 110. In this manner, all the RRHs 105 are precisely synchronized during communication to client devices. In one embodiment, the controller 110 synchronizes the RRHs 105 by transmitting a high precision clock signal to each of the RRHs 105.

Figure 2:
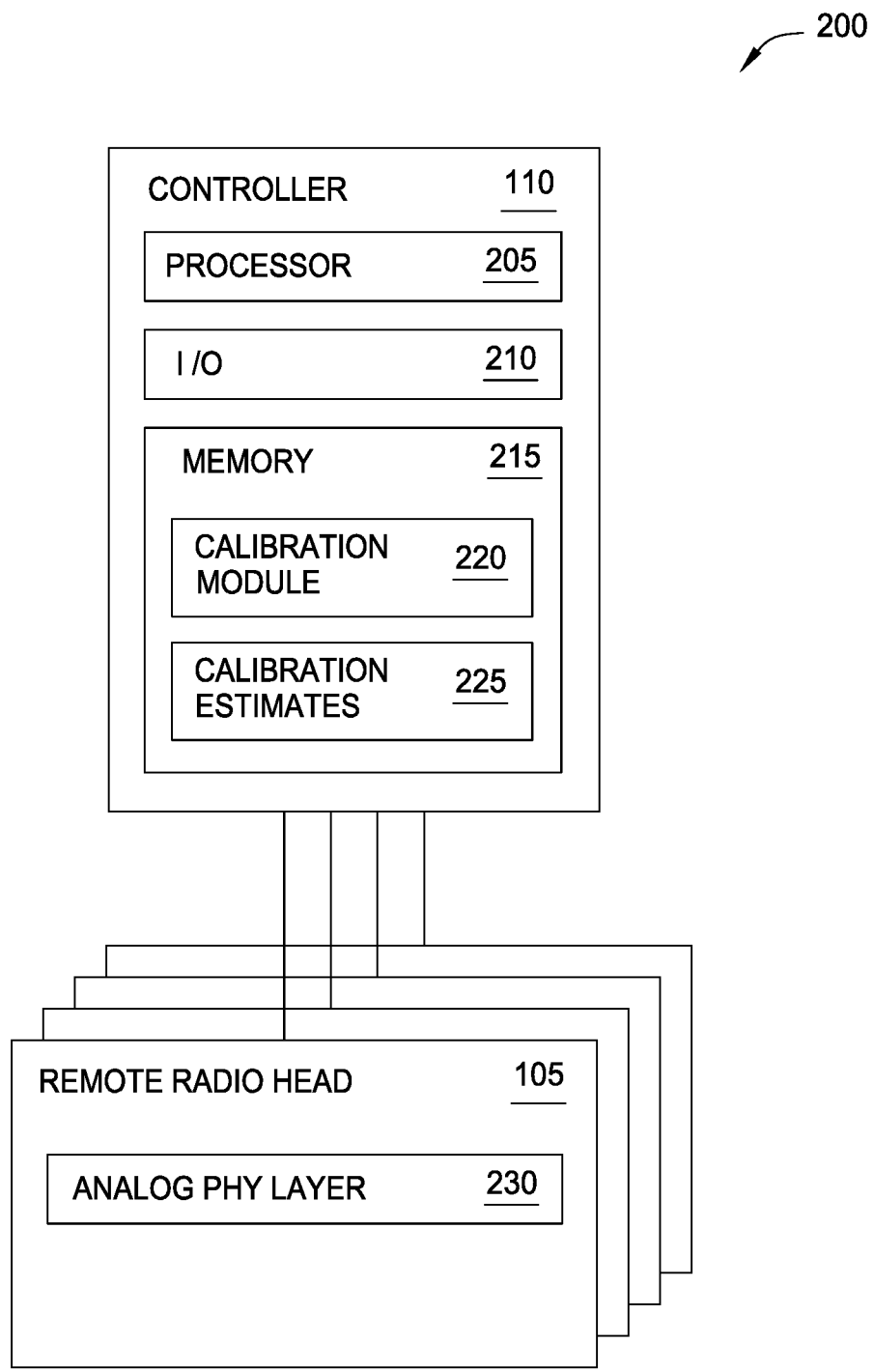
FIG. 2 illustrates a controller coupled with a plurality of radio heads, according to one embodiment disclosed herein.

Turning to FIG. 2, a detailed version of controller 110 and RRHs 105 of FIG. 1 are illustrated according to an exemplary embodiment. The controller 110 comprises a processor 205, input/output (I/O) interface 210, and memory 215. Processor 205 controls the operation of the controller 110. The I/O 210 allows the controller 110 to communicate with other electronic devices (e.g., the RRHs, client devices, network devices, etc.). For example, the I/O 210 may have physical data ports to establish a wired connection with the RRHs 105.

The processor 205 may include any processing element suitable for performing functions described herein, and may include single or multiple core processors, as well as combinations thereof. While the controller 110 is shown as having a single processor 205, in alternative embodiments the controller 110 has a plurality of processors 205. The processor 205 may be included in a single computing device, or may represent an aggregation of processing elements included across a number of networked computing devices.

In one exemplary embodiment, the controller 110 communicates with the RRHs 105 via the I/O 210. For example, the RRHs 105 may be physically connected with the controller 110 via a wired connection, such as Ethernet cables, and the controller 110 communicates with the RRHs via the Ethernet cables. Further, the controller 110 may be connected to an external network (not shown), such as the Internet, or to additional RRHs 105.

Memory 215 may include a variety of computer-readable media selected for their size, relative performance, or other capabilities: volatile and/or non-volatile media, removable and/or non-removable media, etc. Memory 215 may include cache, random access memory (RAM), Flash memory, a hard disk drive, a solid state drive, an optical storage device, and/or a magnetic storage device. In one embodiment, the memory 215 includes software applications for controlling the digital part of the PHY layer, as well as the MAC layer function of the RRHs 105. In one embodiment, the digital PHY layer includes the functions for processing digital signals received at the RRHs 105. Further, the MAC layer includes function for channel access control. Thus, in one exemplary embodiment, the central controller 110 performs the digital PHY layer functions and the MAC layer functions for all of the RRHs 105. While the digital PHY layer and the MAC layer have been described as being within memory 215, a person skilled in the art would appreciate that the PHY layer and the MAC layer may be hardware, software, or a combination of hardware and software.

As shown, memory 215 comprises calibration module 220 and calibration estimates 225. In one exemplary embodiment, calibration module 220 is a method for calibrating a plurality of RRHs 105, as will be discussed in further detail below with regards to FIG. 3. Those skilled in the art should appreciate that memory 215 may contain additional items such as firmware for operating the controller 110, which have not been illustrated for simplicity.

Calibration estimates 225 are estimates compiled from the calibration module 220. In one exemplary embodiment, the calibration estimates 225 comprise a matrix containing calibration estimates for all of the antennas of each of the respective RRHs 105 being calibrated. In another exemplary embodiment, the calibration estimates 225 comprise channel estimates obtained by each RRH 105 at each of the respective RRH's antennas for each of the antennas of the remaining RRHs 105. For example, if there are two RRHs 105 having four antennas each, each antenna will have four calibration estimates, which is one calibration estimate for each of the other RRH's 105 antennas. Thus, with there will be thirty-two calibration estimates in total. While calibration estimates 225 have been described as a being stored in a matrix for simplicity, it should be understood by a person skilled in the art that any method of storing the calibration estimates 225 is possible.

The RRHs 105 are illustrated with an analog PHY layer 230 that receives and transmits wireless signals (i.e., an analog interface), while the central controller 110 includes a digital portion of a PHY layer and a MAC layer for processing received packets and transmitting packets to the RRHs 105. Thus, the PHY layer may be split between the RRHs 105 and the central controller 110 where the higher level processing layers are in the central controller 110. However, in one embodiment, the RRHs 105 comprise a processor (not shown) and memory (not shown) for processing digital signals received via the PHY layer. The RRHs 105 may also include high-level processing layers (e.g., MAC or physical coding sublayer (PCS)) to evaluate the received packets.

Although not shown, the RRHs 105 may include one or more antennas for wireless communication. In one exemplary embodiment, the RRHs 105 are capable of communicating using the 802.11 wireless communication standard via the one or more antennas. In another exemplary embodiment, the RRHs 105 are capable of communicating with a cellular network. Further, the RRHs 105 may comprise a plurality of antennas for communicating using different standards. For example, one antenna may be capable of communicating using the 802.11 wireless standard, while another antenna is capable of communicating with a cellular network. Thus, the RRHs 105 are capable of communicating with a plurality of wireless networks and a plurality of clients using the antennas.

Figure 3:
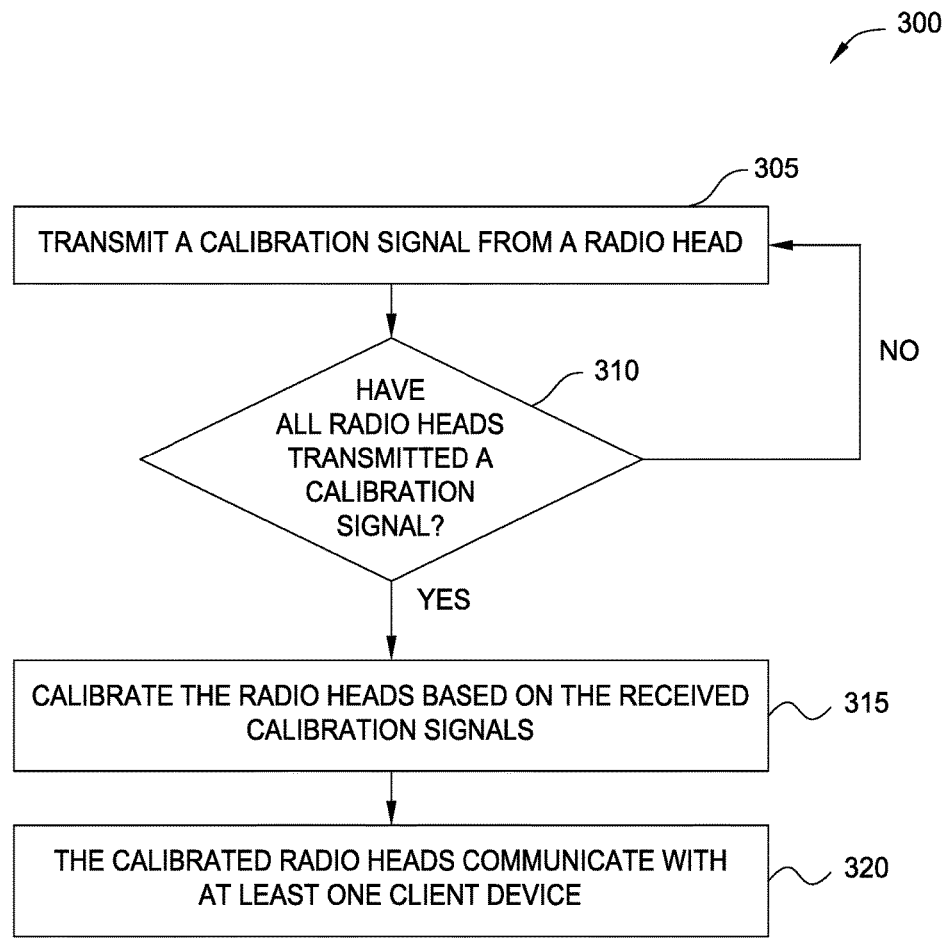
FIG. 3 is a method of calibrating a plurality of radio heads in a wireless system, according to one embodiment disclosed herein.

FIG. 3 illustrates an exemplary method for calibrating the RRHs 105 of FIG. 1. While four RRHs 105 each having four antennas are used for ease of explanation of the method, any number of RRHs having any number of antennas can be calibrated using the method described below such as 2, 6, 16, 100, etc. For ease of explanation, the four RRHs 105 of FIG. 1 will be referred to as W, X, Y, and Z. Each antenna of the respective RRH is designated with a number. For example, the first antenna of RRH W is referred to as $W_1$, the second as $W_2$, and so forth. Further, while the method has been described as applying to remote radio heads, a person skilled in the art will appreciate the method may also be applied to non-remote radio heads, and the terms RRH and radio head (RH) will be used interchangeably in the following paragraphs.

The method begins at block 305, where a first RH transmits a calibration signal. In one exemplary embodiment, the calibration signal is a calibration packet, which is a Null Data Packet (NDP) consisting of a PHY preamble containing one or more 802.11 wireless standard training fields to fully sound the channel. In one exemplary embodiment, the controller 110 derives the channel estimate from the High Throughput (HT), Very High Throughput (VHT), or High Efficiency-Long Training Field (HT/VHT/HE-LTF field) of the NDP. The NDP may include multiple copies of the HT/VHT/HE-LTF field for increased immunity against interference and noise.

For example, W transmits a calibration signal via the four antennas of W that is received at X, Y, and Z. Thus, each antenna of X, Y, and Z receives a calibration signal from each of the four antennas of W. Therefore, $X_1$ receives a separate signal from $W_1$, $W_2$, $W_3$, and $W_4$; $X_2$ receives a separate calibration signal from $W_1$, $W_2$, $W_3$, and $W_4$ and so forth for each of the antennas of X, Y, and Z. Based upon each of the received signals, a respective channel estimate representing the channel characteristics is determined between the antennas that sent the calibration signals and the antennas that received the calibration signals. In one exemplary embodiment, the channel estimates are derived from the preamble of the calibration signal and stored in a matrix for later calibration. In one exemplary embodiment, the RHs W, X, Y, and Z each take turns transmitting the calibration signal to the antennas of the other RHs. In one exemplary embodiment, the periods in which the RHs transmit are non-overlapping such that only a single RH is transmitting at a time.

After block 310, if all the RHs of the system have transmitted a calibration signal, the method continues to block 315. However, if all the RHs of the system have not transmitted a calibration signal, the method returns to block 310 to allow the remaining RHs to transmit a calibration signal. Stated differently, at block 310 the RHs transmit a calibration signal one at a time in a round robin fashion until all RHs have transmitted a calibration signal.

To better explain how the channel estimate is determined and stored, an example is provided for channel estimates between two radio heads A and B. As mentioned above, the effective channel (observed at baseband) from a first RH A to a second RH B is the product of transmitter gain of RH A multiplied by the propagation channel multiplied by the receiver gain of RH B. Thus, rewritten in equation form, $B = R_B H_{AB} T_A$ where B is the channel estimate at RH B when radio head A is transmitting. In one exemplary embodiment, B is an M×M matrix that is not sparse. $R_B$ is a matrix comprising receive path responses for radio head B. $T_A$ is a matrix holding transmit path response for radio head A. $H_{AB}$ is the propagation channel matrix between the antennas of RH A and the antennas of RH B. The channel estimate at the j-th antenna of RH B when the i-th antenna of RH A is transmitting is defined as $b_{j,i}$.

Similarly, the effective channel from RH B to RH A is the product of transmitter gain of RH B multiplied by the propagation channel multiplied by the receiver gain of RH A. Rewritten in equation form, $A = R_A H_{BA} T_B$. Due to reciprocity, $A = R_A H_{BA} T_B = R_A (H_{AB})^T T_B$. In one exemplary embodiment, A is a M×M matrix that is not sparse. $R_A$ is a matrix comprising receive path responses for radio head A, and $T_B$ is a matrix holding transmit path response for radio head B. $H_{BA}$ is the propagation channel matrix between the antennas of RH B and the antennas of RH A. The channel estimate at the j-th antenna of RH A when the i-th antenna of RH B is transmitting is defined as $a_{j,i}$.

Given the above definitions, the channel estimate at the i-th antenna of A when the j-th antenna of B is transmitting is $a_{i,j} = r_{a,i} * h_{i,j} * t_{b,j}$, where $t_{b,j}$ is the transmit gain at the j-th antenna of B, $r_{a,i}$ is the receive gain at the i-th antenna of A, and $h_{i,j}$ is the propagation channel between the two radio heads. Of note, the propagation channel is reciprocal, which means that $h_{i,j} = h_{j,i}$.

Similarly, the channel estimate at the j-th antenna of B when the i-th antenna of A is transmitting is $b_{j,i} = r_{b,j} * h_{j,i} * t_{a,i}$, where $t_{a,i}$ is the transmit gain at the i-th antenna of A, $r_{b,j}$ is the receive gain at the j-th antenna of B, and $h_{i,j}$ is the propagation channel between the two radio heads. As stated above, the propagation channel is reciprocal, which means that $h_{j,i}=h_{i,j}$.

Using the above formulas, the equivalent of the matrix relationship for calibration coefficients is obtained which can be proved by substitution as follows:

$$a_{i,j} \cdot \left(\frac{r_{b,j}}{t_{b,j}}\right) = b_{j,i} \cdot \left(\frac{r_{a,i}}{t_{a,i}}\right) \rightarrow b_{j,i} \cdot c_A(i) - a_{i,j} \cdot c_B(j) = 0$$

This relationship translates into the following matrix equation for the calibration coefficients for both radio heads. In the below matrix, $Zx=0$ and $x \neq 0$. In this manner, a matrix is populated with the channel estimates for each antenna of RH A and RH B. In one exemplary embodiment, the channel estimates are based upon the received calibration signals. This matrix can then be used to solve the calibration coefficients for each of the antennas of RH A and RH B in order to calibrate the RHs.

$$\underbrace{\begin{bmatrix} b_{1,1} & 0 & \cdots & 0 & -a_{1,1} & 0 & \cdots & 0 \\ b_{2,1} & 0 & \ddots & \vdots & 0 & -a_{1,2} & \ddots & \vdots \\ \vdots & \vdots & \ddots & 0 & \vdots & \ddots & \ddots & 0 \\ b_{M,1} & 0 & \cdots & 0 & 0 & \cdots & 0 & -a_{1,M} \\ \hline 0 & b_{1,2} & 0 & 0 & -a_{2,1} & 0 & \cdots & 0 \\ 0 & b_{2,2} & \vdots & \vdots & 0 & -a_{2,2} & \ddots & \vdots \\ \vdots & \vdots & \vdots & \vdots & \vdots & \ddots & \ddots & 0 \\ 0 & b_{M,2} & 0 & 0 & 0 & \cdots & 0 & -a_{2,M} \\ \hline & & \vdots & & & & \vdots & \\ \hline 0 & 0 & 0 & b_{1,M} & -a_{M,1} & 0 & \cdots & 0 \\ 0 & 0 & 0 & b_{2,M} & 0 & -a_{M,2} & \ddots & \vdots \\ \vdots & \vdots & \vdots & \vdots & \vdots & \ddots & \ddots & 0 \\ 0 & 0 & 0 & b_{M,M} & 0 & \cdots & 0 & -a_{M,M} \end{bmatrix}}_{Z \quad M^2 \times 2M}$$

$$\underbrace{\begin{bmatrix} c_A(1) \\ c_A(2) \\ \vdots \\ c_A(M) \\ \hline c_B(1) \\ c_B(2) \\ \vdots \\ c_B(M) \end{bmatrix}}_{x \quad 2M \times 1} = \underbrace{\begin{bmatrix} 0 \\ 0 \\ \vdots \\ 0 \\ \hline 0 \\ \vdots \\ 0 \end{bmatrix}}_{0 \quad M^2 \times 1}$$

Returning to FIG. 3, at block 315, the controller calibrates the RHs. In one exemplary embodiment, the phase and amplitude imbalances between the transmit and receive paths of the RHs are calibrated as a function of frequency. In one exemplary embodiment, all of the transmit and receive paths of all the RHs are calibrated. In another exemplary embodiment, some (e.g., 99%, 95%, 75%, 50%, etc.) of the transmit and receive paths of the RHs are calibrated. The calibration may be per band on the current channel, per band on a different channel, per block of subcarrier, and/or per individual subcarrier. Further, the bulk timing differences between the RHs and the controller are calibrated. In one exemplary embodiment, calibration coefficients are used to calibrate the RHs, which are determined from the transmitted and received calibration signals. In one exemplary embodiment, the calibration coefficients are complex numbers that represent the phase and amplitude adjustment required for the receive path and transmit path so that the multi-RH channel becomes reciprocal. By calibrating the RHs, complete knowledge of the wireless channel is determined to allow for improved communication to client devices. That is, once the RHs are calibrated, the RHs are capable of using beamforming to improve communications with client devices with minimal impact from external factors. Further, the methods of calibration described below provide significant cost savings in terms of processing compared to explicit calibration, while at the same time providing similar benefits to explicit calibration.

In one exemplary embodiment, the gains of RHs X, W, Y, and Z are determined from the sent and received calibration signals. In another exemplary embodiment, each antenna of the RHs is calibrated with a respective gain based on the sent and received calibration signals. In one exemplary embodiment, the calibration of the RHs is a calibration vector determined as the right singular vector of a matrix (Z) comprising the estimated channels for each RH. In another exemplary embodiment, the calibration of the RHs is a calibration vector determined as the eigenvector with the smallest eigenvalue of R, which is a Z'*Z matrix.

Returning to the example above with RHs A and B, an introduction to solving the calibration coefficients will be provided. The calibration vector $c_A$ for RH A is an M×1 vector which is the diagonal elements of $R_A(T_A)^{-1}=(T_A)^{-1}R_A$. Likewise, the calibration vector $c_B$ for RH B is an M×1 vector which is the diagonal elements of $R_B(T_B)^{-1}=(T_B)^{-1}R_B$. The solution for the calibration coefficients of the radio heads is the matrix x above, which is the right singular vector of the matrix Z, defined above, with the smallest singular value. Ideally, the smallest singular value is zero. Further, the solution to $Zx=0$, as the right singular vector of Z with the lowest singular value is the least squares solution.

Since Z is a $M^2 \times 2M$ matrix, its rank can be at most 2M with estimation errors when M>1. In one exemplary embodiment, the rank of Z is 2M−1 for a unique solution to the calibration coefficients. However, under adverse conditions, the rank of Z may be less than that. For example, if the first antenna of RH B does not receive any energy from RH A transmissions, and due to reciprocity the RH A receivers do not receive any energy from the first antenna of RH B, the rank of Z drops by two since the first column and the (M+1)th columns of Z are zero. However, because the channel estimates are determined when forming Z, the channel estimates that are close to zero may be removed from Z, and Z can be solved for the valid set of identifiable calibration factors. In one exemplary embodiment, the unidentifiable calibration factors may be estimated via calibration with a different RH. In another exemplary embodiment, the unidentifiable calibration factors may determine from self-calibration among the antennas of the same RH.

Thus, an example of a calibration vector when two RHs (A and B) are signaling each other in block form is produced below:

$$F_A(B) = \begin{bmatrix} b_{1,1} & 0 & \cdots & 0 \\ b_{2,1} & 0 & \ddots & \vdots \\ \vdots & \vdots & \ddots & 0 \\ b_{M,1} & 0 & \cdots & 0 \\ 0 & b_{1,2} & 0 & 0 \\ 0 & b_{2,2} & \vdots & \vdots \\ \vdots & \vdots & \vdots & \vdots \\ 0 & b_{M,2} & 0 & 0 \\ & \vdots & & \\ 0 & 0 & 0 & b_{1,M} \\ 0 & 0 & 0 & b_{2,M} \\ \vdots & \vdots & \vdots & \vdots \\ 0 & 0 & 0 & b_{M,M} \end{bmatrix} \text{ and}$$

$$G_B(A) = \begin{bmatrix} -a_{1,1} & 0 & \cdots & 0 \\ 0 & -a_{1,2} & \ddots & \vdots \\ \vdots & \ddots & \ddots & 0 \\ 0 & \cdots & 0 & -a_{1,M} \\ -a_{2,1} & 0 & \cdots & 0 \\ 0 & -a_{2,2} & \ddots & \vdots \\ \vdots & \ddots & \ddots & 0 \\ 0 & \cdots & 0 & -a_{2,M} \\ & \vdots & & \\ -a_{M,1} & 0 & \cdots & 0 \\ 0 & -a_{M,2} & \ddots & \vdots \\ \vdots & \ddots & \ddots & 0 \\ 0 & \cdots & 0 & -a_{M,M} \end{bmatrix}$$

$F_A(B)$ consists of the channel estimates obtained by RH B when RH A is transmitting. That is, $b_{i,j}$ is the channel estimate at RH B's i-th antenna when RH A's j-th antenna is transmitting. $G_B(A)$ consists of channel estimates obtained by RH A when RH B is transmitting. That is, $a_{i,j}$ is the channel estimate of RH A's i-th antenna when RH B's j-th antenna is transmitting.

Applying the definitions above:

$$\underbrace{[\,F_A(B) \quad G_B(A)\,]}_{Z} \begin{bmatrix} c_A \\ c_B \end{bmatrix} = 0_{2M \times 1}$$

Using the aforementioned matrix, and applying it to the system of FIG. 1 (i.e., four RHs (W, X, Y, and Z) each having four antennas) that have provided the calibration signal in a round robin fashion results in the following matrix, which will be referred to as $Z_{system}$. The calibration vectors for W, X, Y, and Z are also shown.

$$\underbrace{\begin{bmatrix} F_A(B) & G_B(A) & 0 & 0 \\ F_A(C) & 0 & G_C(A) & 0 \\ F_A(D) & 0 & 0 & G_D(A) \\ 0 & F_B(C) & G_C(B) & 0 \\ 0 & F_B(D) & 0 & G_D(B) \\ 0 & 0 & F_C(D) & G_D(C) \end{bmatrix}}_{Z_{system}} \begin{bmatrix} c_A \\ c_B \\ c_C \\ c_D \end{bmatrix} = 0$$

Every block submatrix of the coefficient matrix $Z_{system}$ is $(M^2 \times M)$, resulting in a $(M^2 * H * (H-1)/2 \times M * H)$ coefficient matrix. Although the size of $Z_{system}$ is large, we can determine the calibration coefficients by determining the eigenvector with the smallest eigenvalue. In one exemplary embodiment, singular value decomposition (SVD) is used to determine the eigenvector of the matrix.

Once the calibration coefficients are determined from the matrix, the gains can be determined for each of the RHs. That is, the effective channel (observed at baseband) from a first RH A to a second RH B is the product of transmitter gain of RH A multiplied by the propagation channel multiplied by the receiver gain of RH B. Thus, rewritten in equation form, $B = R_B H_{AB} T_A$ where B is the channel estimate at RH B when radio head A is transmitting. Since each of the RHs has received a signal from the remaining RHs which allows the RH to determine the receiver gain, as well as the channel estimates, the controller can use the reciprocity described above to solve for the transmitter gain. Thus, the determined calibration coefficients are used to determine the gains of the antennas. In one exemplary embodiment, the calibration coefficients are complex numbers that represent the phase and amplitude adjustment required for each receive and transmit path so that the channel becomes reciprocal among the plurality of RHs. In one exemplary embodiment, the channel estimates may be used to determine the implicit channel (i.e., the uplink channel) measurements among the RHs and calibrate the implicit channel measurements to determine the downlink channel.

Returning to FIG. 3, at block 320 the calibrated RHs communicate with one or more client devices. In one exemplary embodiment, the RHs send data packets to the client devices, as well as receive data packets. In one exemplary embodiment, the calibrated RHs communicate with the client devices using beamforming. The method concludes after block 320.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for calibrating a first radio head and a second radio head, wherein the first radio head and the second radio head comprise a respective plurality of antennas, the method comprising:
    transmitting, via the plurality of antennas of the first radio head, a first calibration signal to the second radio head, wherein the plurality of antennas of the second radio head receives the first calibration signal;
    transmitting, via the plurality of antennas of the second radio head, a second calibration signal to the first radio head, wherein the plurality of antennas of the first radio head receives the second calibration signal; and
    calibrating the first radio head and the second radio head based on a calibration vector determined from the calibration signals received at the respective plurality of antennas of the first radio head and the second radio head, wherein calibrating the first and second radio heads further comprises:
        determining a respective gain for each of the antennas of the first radio head and the second radio head;
        determining a respective phase for each of the antennas of the first radio head and the second radio head;
        determining a respective channel estimate for each of the plurality of antennas of the first radio head and the second radio head;
        forming a matric comprising the plurality of channel estimates; and
        determining an eigenvector with a smallest eigenvalue of the matrix.

2. The method according to claim 1, wherein determining the respective channel estimate for each of the plurality of antennas further comprises:
  determining the respective channel estimate for each of the antennas of the first radio head based on the received calibration signal from each of the antennas of the second radio head; and
  determining the respective channel estimate for each of the antennas of the second radio head based on the received calibration signal from each of the antennas of the first radio head.

3. The method according to claim 1, wherein the first and second radio heads comprise a Multiple-Input and Multiple-Output (MIMO) system and utilize Time Division Duplex (TDD).

4. The method according to claim 1, the first radio head and the second radio head are communicatively coupled with a controller, wherein the controller is configured to process data received at the first radio head and the second radio head.

5. The method according to claim 1, wherein, upon calibrating the first and second radio heads, the first and second radio heads are capable of transmitting a plurality of data signals simultaneously over a same channel.

6. A system, comprising:
  a processor; and
  a memory comprising instructions which, when executed on the processor, performs an operation for calibrating a first radio head and a second radio head, wherein the first radio head and the second radio head comprise a respective plurality of antennas, the operation comprising:
    transmitting, via the plurality of antennas of the first radio head, a first calibration signal to the second radio head, wherein the plurality of antennas of the second radio head receives the first calibration signal;
    transmitting, via the plurality of antennas of the second radio head, a second calibration signal to the first radio head, wherein the plurality of antennas of the first radio head receives the second calibration signal; and
    calibrating the first radio head and the second radio head based on a calibration vector determined from the calibration signals received at the respective plurality of antennas of the first radio head and the second radio head, wherein calibrating the first and second radio heads further comprises:
      determining a respective gain for each of the antennas of the first radio head and the second radio head;
      determining a respective phase for each of the antennas of the first radio head and the second radio head;
      determining a respective channel estimate for each of the plurality of antennas of the first radio head and the second radio head;
      forming a matrix comprising the plurality of channel estimates; and determining an eigenvector with a smallest eigenvalue of the matrix.

7. The system according to claim 6, wherein determining the respective channel estimate for each of the plurality of antennas further comprises:
  determining the respective channel estimate for each of the antennas of the first radio head based on the received calibration signal from each of the antennas of the second radio head; and
  determining the respective channel estimate for each of the antennas of the second radio head based on the received calibration signal from each of the antennas of the first radio head.

8. The system according to claim 6, wherein the first and second radio heads comprise a Multiple-Input and Multiple-Output (MIMO) system and utilize Time Division Duplex (TDD).

9. The system according to claim 6, wherein, upon calibrating the first and second radio heads, the first and second radio heads are capable of transmitting a plurality of data signals simultaneously over the same channel.

10. The system according to claim 6, the first radio head and the second radio head are communicatively coupled with a controller, wherein the controller is configured to process data received at the first radio head and the second radio head.

11. A computer program product for calibrating a first radio head and a second radio head, wherein the first radio head and the second radio head comprise a respective plurality of antennas, the computer program product comprising a non-transitory computer-readable medium having program instructions embodied therewith, the program instructions executable by a processor to perform an operation comprising:
  transmitting, via the plurality of antennas of the first radio head, a first calibration signal to the second radio head, wherein the plurality of antennas of the second radio head receives the first calibration signal;
  transmitting, via the plurality of antennas of the second radio head, a second calibration signal to the first radio head, wherein the plurality of antennas of the first radio head receives the second calibration signal; and
  calibrating the first radio head and the second radio head based on a calibration vector determined from the calibration signals received at the respective plurality of antennas of the first radio head and the second radio head, wherein upon calibrating the first and second radio heads, the first and second radio heads are capable of transmitting a plurality of data signals simultaneously over the same channel and, wherein calibrating the first and second radio heads further comprises:
    determining a respective gain for each of the antennas of the first radio head and the second radio head; and
    determining a respective phase for each of the antennas of the first radio head and the second radio head;
    determining a respective channel estimate for each of the plurality of antennas of the first radio head and the second radio head;
    forming a matrix comprising the plurality of channel estimates; and
    determining an eigenvector with the smallest eigenvalue of the matrix.

12. The computer program product according to claim 11, wherein determining the respective channel estimate for each of the plurality of antennas further comprises:
  determining the respective channel estimate for each of the antennas of the first radio head based on the received calibration signal from each of the antennas of the second radio head; and
  determining the respective channel estimate for each of the antennas of the second radio head based on the received calibration signal from each of the antennas of the first radio head.

13. The computer program product according to claim 11, the first radio head and the second radio head are communicatively coupled with a controller, wherein the controller is configured to process data received at the first radio head and the second radio head.

14. The computer program product according to claim 11, wherein, upon calibrating the first and second radio heads, the first and second radio heads are capable of transmitting a plurality of data signals simultaneously over a same channel.

* * * * *